US011555345B2

(12) United States Patent
Hedeby et al.

(10) Patent No.: US 11,555,345 B2
(45) Date of Patent: Jan. 17, 2023

(54) VACUUM INSULATED GLAZING UNIT WITH A LASER ENGRAVED CODE

(71) Applicant: VKR HOLDING A/S, Hørsholm (DK)

(72) Inventors: Lasse Hamer Hedeby, Hørsholm (DK); Kasper Korsholm Christiansen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 0 days.

(21) Appl. No.: 17/059,626

(22) PCT Filed: Jun. 14, 2019

(86) PCT No.: PCT/EP2019/065675
§ 371 (c)(1),
(2) Date: Nov. 30, 2020

(87) PCT Pub. No.: WO2019/238922
PCT Pub. Date: Dec. 19, 2019

(65) Prior Publication Data
US 2021/0262279 A1 Aug. 26, 2021

(30) Foreign Application Priority Data

Jun. 15, 2018 (DK) .......................... PA 2018 70404

(51) Int. Cl.
*E06B 3/66* (2006.01)
*B41M 5/24* (2006.01)
*B41M 5/26* (2006.01)
*B32B 17/06* (2006.01)

(52) U.S. Cl.
CPC ............ *E06B 3/6612* (2013.01); *B41M 5/24* (2013.01)

(58) Field of Classification Search
CPC .... E06B 3/6612; E06B 3/66304; B41M 5/24; B41M 5/26; B32B 17/06
See application file for complete search history.

(56) References Cited

U.S. PATENT DOCUMENTS 8,221,857 B2 * 7/2012 Jaeger .................. E06B 3/6612
52/786.13
2008/0304525 A1 12/2008 Kupisiewicz
2010/0107525 A1 5/2010 Grzybowski
2013/0153550 A1 6/2013 Dear
2015/0024151 A1 1/2015 Dai
(Continued)

FOREIGN PATENT DOCUMENTS

CN 204645999 U 9/2015
CN 206053747 U 3/2017
(Continued)

OTHER PUBLICATIONS

International Search Report for corresponding PCT/EP2019/065675 filed Jun. 14, 2019; dated Oct. 8, 2019.

*Primary Examiner* — Joanna Pleszczynska
(74) *Attorney, Agent, or Firm* — Cantor Colburn LLP

(57) ABSTRACT

The present disclosure relates to a vacuum insulated glazing (VIG) unit and tempered glass pane therefore. Furthermore, the present disclosure relates to a window comprising a VIG unit enclosed in a frame. Also, the present invention relates to a method of producing a tempered glass pane for a VIG unit, a method for producing a VIG unit and the use of a tempered glass pane as described herein in a VIG unit and the production thereof.

15 Claims, 5 Drawing Sheets

(56) References Cited

U.S. PATENT DOCUMENTS

2017/0001906 A1    1/2017   Karagoz
2017/0340518 A1   11/2017   Logunov

FOREIGN PATENT DOCUMENTS

| CN | 106746755 A | 5/2017 |
| CN | 107628754 A | 1/2018 |
| EP | 1298100 A1 | 4/2003 |
| EP | 2743240 A2 | 6/2014 |
| JP | 2004130789 A | 4/2004 |
| JP | 2004323252 A | 11/2004 |
| WO | 2015139929 A1 | 9/2015 |

* cited by examiner

VACUUM INSULATED GLAZING UNIT WITH A LASER ENGRAVED CODE

The present disclosure relates to a vacuum insulated glazing (VIG) unit and tempered glass pane therefore. Furthermore, the present disclosure relates to a window comprising a VIG unit enclosed in a frame. Also, the present invention relates to a method of producing a tempered glass pane for a VIG unit, a method for producing a VIG unit and the use of a tempered glass pane as described herein in a VIG unit and the production thereof.

BACKGROUND

Vacuum-insulated glass (VIG) units typically include two or more glass panes, spaced by an array of pillars, and sealed at the periphery to provide an evacuated space (i.e., vacuum) located between the glass panes. The evacuated space is sealed at a reduced pressure such as 0.001 millibars or less in order to ensure an insulating effect of the VIG unit. The overall construction provides improved thermal and noise insulating properties compared to ordinary glass windows. To prevent sagging and contact between adjacent glass panes, the pillars can serve as discrete spacers between adjacent glass panes.

When VIG units are produced, the producer will need to mark the individual panes for the VIG unit and/or the final VIG unit in order to be able to identify the VIG unit after assembly in a building. The marking on the VIG unit and/or the glass pane will normally include a code, which allows the producer to identify e.g. the production date, the production facility, the production method, the serial number and similar. The code may be added onto the VIG unit after end production. However, this normally induces a risk of code falling of the VIG unit.

Previously, laser engraving has been used for creating a code in laminated glass panes used for a vacuum insulated glazing (VIG) unit. An example is shown in JP2004130789, which discloses a method of laser engraving a code into a glass pane in a VIG unit comprising laminated glass panes. Using the method of JP2004130789 for engraving a code into a tempered glass pane by means of laser engraving is, however, not possible as the tempered glass panes will break in process.

US20170001906 discloses that tempered glass panes may be laser imprinted to contain a code contrary to the common believes if the laser engraving is prepared prior to the tempering of the glass panes. Another requirement according to US20170001906 is that the laser engraving must introduced into the tensile stress region of the glass pane, i.e. the region extending from the middle of the glass pane and outwards ending somewhat before the outermost part of the glass pane adjacent to the surface region. In this region, the tensile stress within the glass pane is larger than the compressive stress.

However, the requirements to the glass panes used in a VIG unit differs vastly from the requirements to regular tempered glass panes. Thus, when using a tempered glass pane in the production of a VIG unit, the glass panes are normally subjected to a high pressure, and to high temperatures possibly combined with a rapid increase/decrease of the temperature. This introduces a risk of the tempered laser engraved glass panes breaking, in particular at the locations where micro-cracks has been introduced by means of laser engraving.

There is thus a need for a method of adding a code in tempered glass panes used in VIG units such that the VIG unit is equipped with an identification code.

DESCRIPTION OF THE INVENTION

Disclosed herein is in a first aspect is a vacuum insulated glazing unit comprising:
  a first tempered glass pane and a second tempered glass pane arranged in parallel, the first tempered glass pane and the second tempered glass pane each having an inner surface and an outer surface, where the inner surfaces of the first tempered glass pane and the second tempered glass pane oppose each other;
  spacers arranged between the opposed inner surfaces;
  a side seal material peripherally arranged between the first tempered glass pane and the second tempered glass pane creating an internal void between the glass panes,
  wherein the first tempered glass pane has a thickness T defined by the distance between the inner surface and the outer surface of the first tempered glass pane, and the second tempered glass pane has a thickness T' defined by the distance between the inner surface and the outer surface of the second tempered glass pane.

The first tempered glass pane comprises at least one laser engraved region with a code engraved into the first tempered glass pane by means of laser engraving, where the at least one laser engraved region has a height H extending parallel with the direction defining the thickness T of the first tempered glass pane.

By the above is obtained a VIG unit with an easily read identification code, which is laser engraved into a tempered glass pane contrary to what would be expected. The obtained VIP unit is robust and remains intact for large number of years as required by the industrial standard for VIG units.

Disclosed herein is in a second aspect is a vacuum insulated glazing unit comprising:
  a first tempered glass pane and a second tempered glass pane arranged in parallel, the first tempered glass pane and the second tempered glass pane each having an inner surface and an outer surface, where the inner surfaces of the first tempered glass pane and the second tempered glass pane oppose each other;
  spacers arranged between the opposed inner surfaces;
  a side seal material peripherally arranged between the first tempered glass pane and the second tempered glass pane creating an internal void between the glass panes,
  In the second aspect, the first tempered glass pane comprises:
    a first compressive stress region located adjacent to the outer surface;
    a second compressive stress region located adjacent to the inner surface;
    an internal tensile stress region located between the first compressive stress region and the second compressive stress region;
  wherein at least one laser engraved region is positioned in the first compressive stress region or the second compressive stress region of the first tempered glass pane.

Contrary to what is discloses US20170001906, introducing the code into a compressive stress region of the glass pane allows for the productions of a long lasting VIG unit.

Disclosed herein is in a third aspect is a vacuum insulated glazing unit comprising:
  a first tempered glass pane and a second tempered glass pane arranged in parallel, the first tempered glass pane and the second tempered glass pane each having an inner surface and an outer surface, where the inner surfaces of the first tempered glass pane and the second tempered glass pane oppose each other;

spacers arranged between the opposed inner surfaces;

a side seal material peripherally arranged between the first tempered glass pane and the second tempered glass pane creating an internal void between the glass panes, In the third aspect, the first tempered glass pane comprises:

a first compressive stress region located adjacent to the outer surface;

a second compressive stress region located adjacent to the inner surface;

an internal tensile stress region located between the first compressive stress region and the second compressive stress region;

wherein at least one laser engraved region is positioned in the internal tensile stress region of the first tempered glass pane.

By "laser engraving" is meant the use of a laser for introduces micro-cracks in the glass. The micro-cracks are normally positioned below the surface of the glass pane. The micro-cracks form a code in the glass pane. By "code" is therefore meant any type of symbol, written information, graphics logo, a barcode, such as a matrix barcode for identification, or the like, which is formed by the sum of the micro-cracks introduced in the glass pane be means for laser engraving. The area in the glass pane, wherein the micro-cracks are formed by means of laser engraving is referred to as a laser engraved region.

By spacers are meant any type of material which may be used for preventing sagging and contact between adjacent glass panes. An examples of spacers are pillars, which may serve as discrete spacers between adjacent glass panes.

By side seal material is meant a material attached around the periphery of the glass panes thereby forming a sealed cavity between the glass panes. Various types of side seal material may be use.

Disclosed herein is in a fourth aspect is the use of the vacuum insulated glazing unit fora window.

Disclosed herein is in a fifth aspect is a method for producing a vacuum insulated glazing unit comprising the step of providing a glass pane unit comprising:

a first tempered glass pane and a second tempered glass pane arranged in parallel, the first tempered glass pane and the second tempered glass pane each having an inner surface and an outer surface, the inner surfaces opposing each other, wherein the first tempered glass pane comprises at least one laser engraved region with a code engraved into the glass pane by means of laser engraving;

spacers arranged between the opposed inner surfaces, and a side seal material peripherally arranged between the first tempered glass pane and the second tempered glass pane creating a sealed cavity between the glass panes.

The method further comprises the steps of:

placing the glass pane unit in a furnace;

heating the glass pane unit by at least the furnace to a temperature (Th);

lowering the temperature to a curing temperature (Tcure), and reducing pressure in the internal cavity between the two tempered glass panes to a pressure of no higher than 0.001 mbar.

Disclosed herein is in a sixth aspect is a glass pane having a tempered surface, the glass pane having two opposite positioned surfaces with a distance T between them defining the thickness of the glass pane, the glass pane comprising:

two compressive stress regions including a first and a second compressive stress region, where the two compressive stress regions each are adjacent to one of the opposing surfaces, and an internal tensile stress region positioned between the compressive stress regions, wherein the glass pane further comprises at least one laser engraved region with a code engraved into the glass pane by means of laser engraving, wherein the at least one laser engraved region has a height H extending parallel with the direction defining the thickness T of the pane, and wherein the at least one laser engraved region is positioned in one of the compressive stress regions.

Contrary to what is discloses US20170001906, introducing the code into a compressive stress region of the glass pane, which may be used in the production of a stable and long lasting VIG units.

Disclosed herein is in a seventh aspect is a method for producing a tempered glass pane with a laser engraved coding, the method comprising the steps of:

providing a non-tempered glass pane having two opposite surfaces with a distance T between them defining the thickness of the glass pane, laser engraving a first code into a first laser engraving region using a pulsed laser focussed into the first laser engraving region, thereby obtaining a laser engraved glass pane, and tempering the laser engraved glass pane thereby obtaining a tempered glass pane with a laser engraved coding, wherein the tempered glass pane comprises:

two compressive stress regions including a first and a second compressive stress region, where the two compressive stress regions each are adjacent to one of the opposing surfaces, and an internal tensile stress region positioned between the two compressive stress regions, and wherein the first laser engraving region is engraved into the first compressive stress region.

By tempering the glass pane after the code has been introduced into the glass pane, large cracks in the glass pane is avoided.

Disclosed herein is in an eight aspect is the use of at least one laser engraved glass pane in the production of a vacuum insulated glazing unit.

Disclosed herein is in a ninth aspect is the use of at least one laser engraved glass pane in a vacuum insulated glazing unit.

The above described and other features are exemplified by the following figures and detailed description.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

DETAILED DESCRIPTION

Figure 1A:
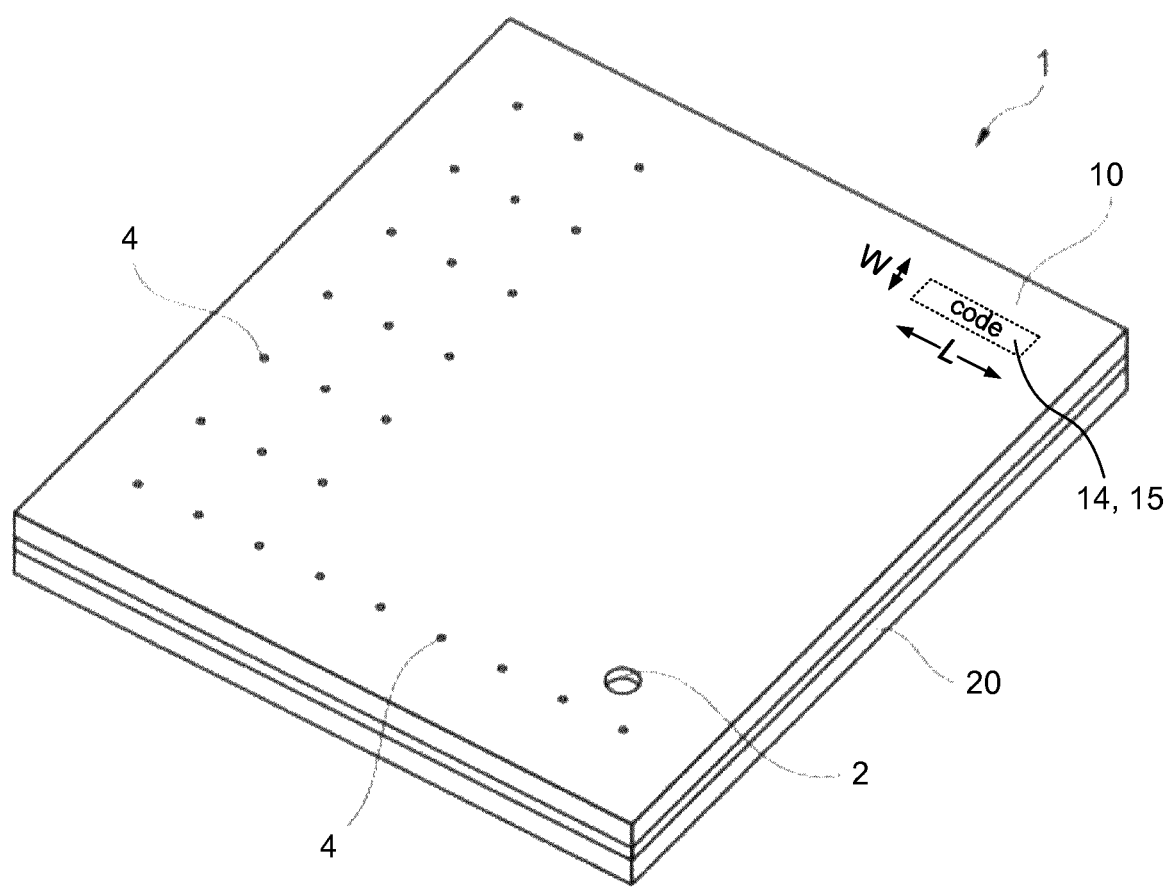
FIGS. 1a and 1b show an example of a vacuum insulated glazing unit in a top-down slightly sideward view (1a) and a side-ward view (1b).

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

The present disclosure relates to a vacuum insulated glazing (VIG) unit and tempered glass pane therefore. Furthermore, the present disclosure relates to a window comprising a VIG unit enclosed in a frame. Also, the present invention relates to a method of producing a tempered glass pane for a VIG unit, a method for producing a VIG unit and the use of a tempered glass pane as described herein in a VIG unit and the production thereof.

Figure 1B:
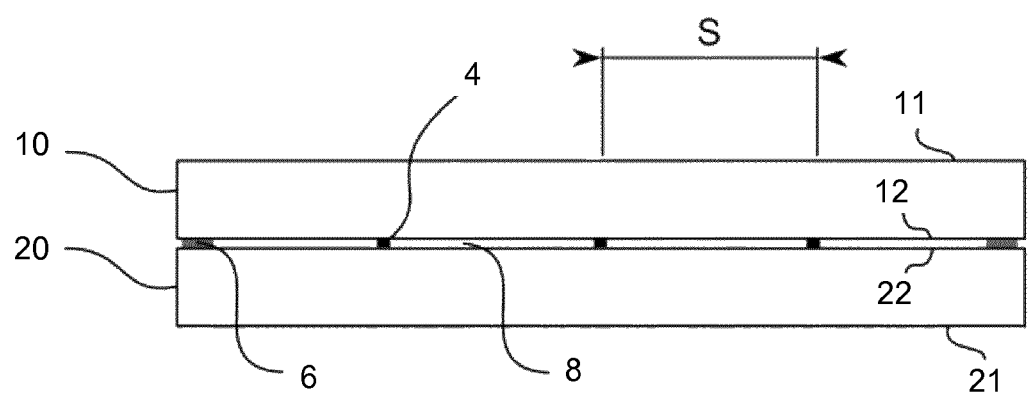
Figure 2A:
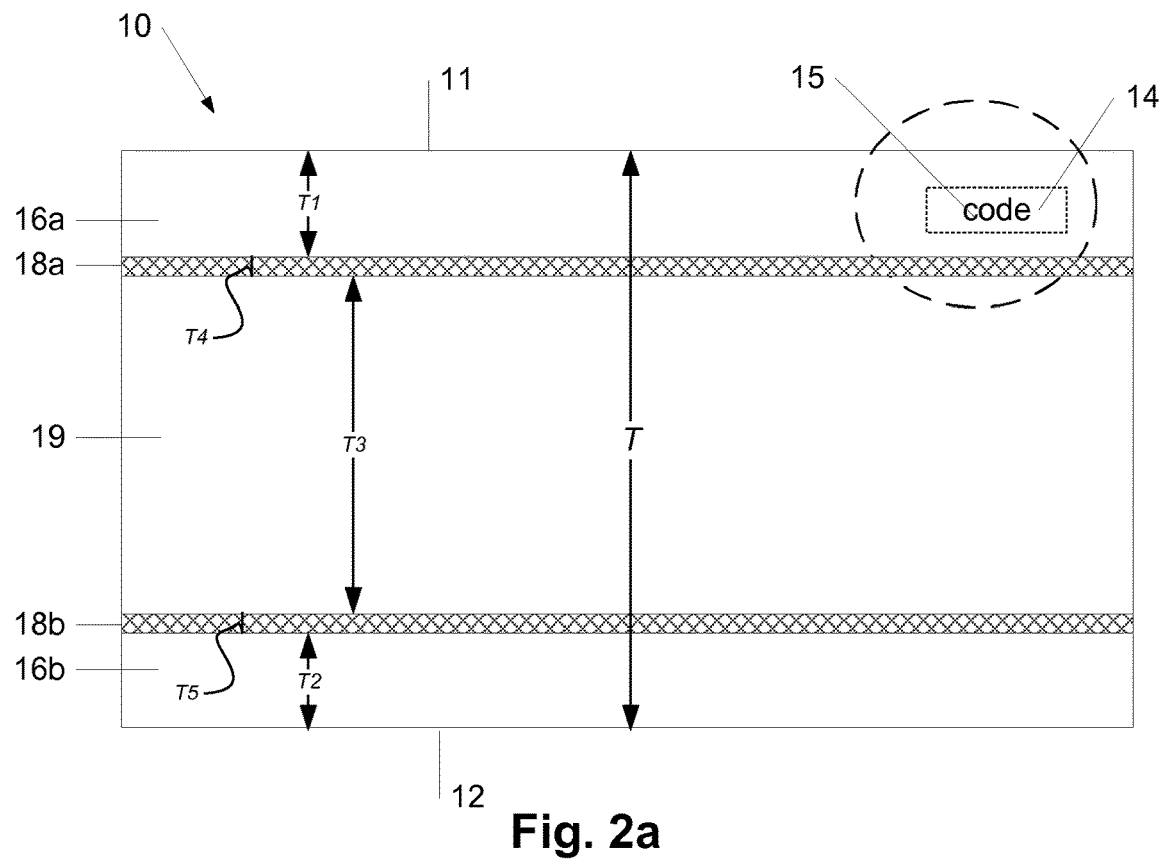
FIG. 2a shows part of a tempered glass pane in a side view and FIG. 2b shows a close up of the glass pane with a laser engraved code in a compressive stress region.
Figure 2B:
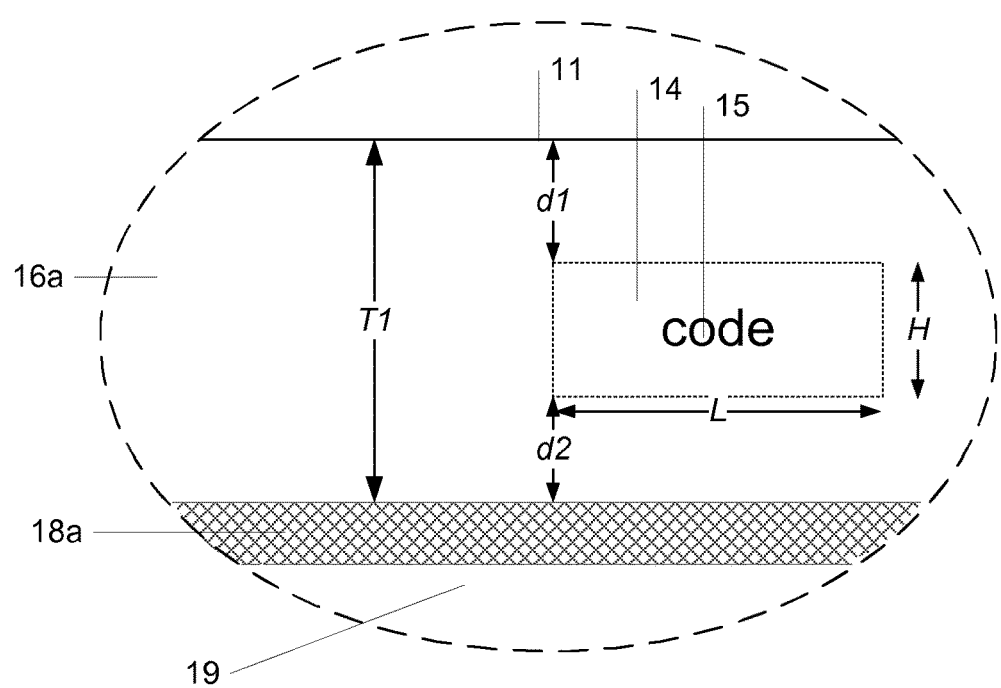

Referring to FIGS. 1a and 1b an example of a vacuum insulated glazing (VIG) unit 1 is displayed in a top-down slightly sideward view and a side-ward view, respectively. The VIG unit comprises a first tempered glass pane 10 and a second tempered glass pane 20 arranged in parallel. The first tempered glass pane 10 has an outer surface 11 and an inner surface 12. Likewise, the second tempered glass pane 20 has an outer surface 21 and an inner surface 22. The two inner surfaces 12, 22 are opposing each other. The naming of the surfaces inner and outer surface thus are merely a denotation of the positing of the tempered glass panes in the VIG unit. The surfaces may be similar in terms of surface structure and material. Referring to FIGS. 2a and 2b, two close up side views of a tempered glass pane is shown. The reference numerals used in FIGS. 2a and 2b are those matching the reference numerals of the first tempered glass pane 10. However, it should be understood that the description of the tempered glass pane in FIGS. 2a and 2b also applies in a similar manner to the second tempered glass pane 20 of FIGS. 1a and 1b. Further, the denotation marking inner and outer surfaces in FIGS. 1a and 1b may be seen merely as marking of a first and a second surface in FIGS. 2a and 2b.

The glass panes 10, 20 are tempered glass panes to increase strength. The term "tempered glass pane" as used herein is understood to mean glass panes in which compressive stresses have been introduced in the surface(s) of the glass pane. For glass to be considered strengthened this compressive stress on the surface(s) of the glass can be a minimum of 69 MPa (10,000 psi) and may be higher than 100 MPa. The VIG is heated during production in order to form the periphery seal etc. and some glass strength may be annealed or lost during manufacture.

In one or more examples, the tempered glass panes have been tempered by thermal tempering, chemical tempering, plasma tempering, or a combination comprising at least one of the foregoing.

Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass.

The tempered glass panes may have been tempered by thermal tempering. Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane.

The first tempered glass pane 10 and the second tempered glass pane 20 each has a thickness T defined by the distance between the inner surface 12, 22 and the outer surface 11, 21 of the tempered glass panes. The thickness of the two tempered glass panes may be the same, which allows for usage of the same production lines for producing the tempered glass panes. The thickness of the two tempered glass pane may alternatively by different if e.g. coating or similar is used on one of the panes. A thinner glass pane may also be used for one of the glass panes possibly reducing production costs. The thickness of the tempered glass panes may be between 1 to 6 mm, or between 1-6 mm, or between 2-5 mm, or between 2.5-4.5 mm. The glass panes are normally substantially transparent to visible light (i.e. at least about 50% transparent, more preferably at least about 70% transparent, more preferably at least about 80% transparent, and most preferably at least about 90% transparent), although they may be tinted in some examples.

Any suitable glass from which tempered glass panes can be obtained may be used for the tempered glass panes 10, 20. Examples include a soda lime silica glass and an alkali aluminosilicate glass.

Between the opposed inner surfaces 12, 22 of the two tempered glass panes 10, 20 are arranged spacers 4. By spacers are meant any type of material, which may be used for preventing sagging and contact between adjacent glass panes 10, 20. The spacers 4 provide, and thus define the distance of, the void/gap 8 between the inner surfaces 12, 22 of the glass panes 10, 20. The spacers 4 may be integral or adhered to the inner surfaces of the glass panes. The spacers 4 may alternatively be discrete and held in positon by atmospheric pressure on the outer surfaces 11, 21 of the glass panes 10, 20. An example of spacers are the pillars as shown in FIGS. 1a and 1b. However, the spacers may have any suitable shape, for example spherical, cylindrical, square, rectangular, rod-like, bead-like, oval, trapezoidal, or the like.

The spacers 4 can be arranged in an array separated by a distance S between adjacent spacers. The distance S refers to the distance between spacers, the spacer-to-spacer distance between each adjacent spacer, and/or the distance between two consecutive spacers. The distance S between two spacers may be between 20 to 120 mm, such as e.g. 25 to 80 mm, or 30 to 60 mm, or 20-60 mm, or 25-55 mm, or 30-50 mm, or 35-45 mm, such as e.g. 40 mm. The distance between spacers may be measured from an outer edge of adjacent spacers. Alternatively, the distance between spacers may be measured from the centres of adjacent spacers. The spacer-to-spacer distance can be the same or different between each adjacent spacer. Using the same spacer-to-spacer distance may simplify the process of positioning the spacers on one of the glass panes as the same settings can be used in the tool, which places the spacers. Using a different spacer-to-spacer distance may create a VIG unit where the user less easily notices the spacers when looking out the window into which the VIG unit has been inserted as the eye often pays less attention to an uneven and random positioning of spacers compared to an even-structured positioning. Greater distances between spacers can increase the compressive load on each spacer and can cause a VIG unit to lose vacuum due to stress and cracks. A denser positioning of the spacers may therefore be used in specific region to increase the robustness of the VIG unit.

The spacers may have a height of 0.05 to 0.7 mm, such as between 0.1 to 0.4 mm, or between 0.15 to 0.3 mm. In one or more examples, the spacers have the same height. This keeps the production cost low as only one type of spacer is needed. The tool used for positioning the spacers on the glass pane will further not need to have individual settings for placing spacers with a difference in height.

The spacers may alternatively have the different heights, including at least two different heights. As the distance between the two tempered glass panes may vary from region to region in VIG unit, a difference in height of the spacers will allow for compensation of these distance variations. In one or more examples, each spacer independently has a height of 0.05 to 0.7 mm, preferably 0.1 to 0.4 mm, more preferably 0.15 to 0.3 mm.

The spacers may have a width of between 0.1 to 1 mm, or between 0.2 to 0.8 mm, such as between 0.3 to 0.7 mm. Again, the width of the individual spacers may be the same or may be different.

The spacer can be any suitable material, for example solder glass, a polymer (e.g., Teflon), plastic, ceramic, glass, metal, or the like. In one or more examples, the spacer comprises a steel or a solder glass.

The spacer can include a surface coating that is disposed on the outer surface of the spacer to reduce cracks in the glass panes and reduce scratches when the glass panes flex and move. Any suitable surface coating may be used, for example a surface coating that comprises a low coefficient of friction (e.g., has a lower coefficient of friction than the spacer material). The surface coating can include tungsten disulfide ($WS_2$), molybdenum disulfide ($MoS_2$), tungsten diselenide ($WSe_2$), molybdenum diselenide ($MoSe_2$), or a combination thereof. In some examples, the surface coating is disposed on the top and/or bottom of the spacer. As used herein, "top" and "bottom" of the spacer means the portions of the spacer configured to contact the glass pane, for example that contact the spacer contact regions of the glass pane. In one or more examples, the surface coating is in contact with the inner surface of at least one of the glass panes.

A side seal material 6 is peripherally arranged between the first tempered glass pane 10 and the second tempered glass pane 20 creating an internal void/gap 8 between the glass panes. Thus, the side seal material is attached around the periphery of the first tempered glass pane and the second tempered glass pane and forms a sealed cavity between the glass panes.

Any suitable side seal material can be used, including solder glass, indium, 99% indium (In) wire available from Arconium (Providence, R.I.), liquid glass (i.e., glass composition with water in it when applied, wherein the water evaporates when heated to form the inner seal portion 45), Indalloy No. 53 available from Indium Corp. in paste form having a composition of 67% Bi and 33% In (% by weight), Indalloy No. 1 from Indium Corp. in paste form having a composition of 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In, and 2.8% Ag, Indalloy No. 2 available from Indium Corp. in paste form having a composition of 80% In, 15% Pb and 5% Ag, Indalloy No. 3 available from Indium Corp. in paste form having a composition of 90% In and 10% Ag, or any other suitable material.

The side seal material can be a soldering material, for example a glass solder frit material. The glass solder frit material may have a low melting temperature, wherein thermal treatment can be used to hermetically seal the periphery of the VIG unit. Alternatively, the side seal material may comprise a glass solder frit paste with a low melting temperature, where the paste further comprises of about 70 wt % of an organic binder, inorganic fillers, and solvents, for example water or alcohol.

In an example, the frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. The soldering material may be provided as a combination of two different materials comprising glass solder frit with different thermal expansion coefficients that are adjusted to correspond to the thermal expansion coefficients of the bonded parts. Also, several solder materials may allow pre-sintering of a first solder to the glass surface and subsequently use of a second solder to join to the first solder.

The VIG unit may comprise an evacuation opening positioned in either the first tempered glass pane or the second tempered glass pane. The evacuation opening allows for an evacuation of the internal void. In FIG. 1a is shown an evacuation opening 2 in the first tempered glass pane 10 of VIG unit 1. The internal void 8 may alternatively be evacuated by other means and the evacuation opening shown in FIG. 1a should therefore not be seen as a limiting feature of the VIG unit 1.

As show in in FIG. 1a, the first tempered glass pane 10 comprises a laser engraved region 14 with a code 15 engraved into the first tempered glass pane by means of laser engraving. If the VIG unit comprises an evacuation opening 2, it may be positioned in the same glass pane as the laser engraved code 15, but alternatively also be positioned on the other glass pane not having a code engraved. Both glass panes 10, 20 may also each have at least one code engraved into it.

By "laser engraving" is meant the use of a laser for introduces micro-cracks in the glass. The micro-cracks are normally positioned below the surface of the glass pane. The micro-cracks form a code in the glass pane. By "code" is therefore meant any type of symbol, written information, graphics logo or the like, which is formed by the sum of the micro-cracks introduced in the glass pane be means for laser engraving. The area in the glass pane, wherein the micro-cracks are formed by means of laser engraving is referred to as a laser engraved region.

The code may be engraved into the glass pane prior to tempering of the glass pane. This ensures that the tempered glass pane does not easily crack subsequently as there is a height risk of attempting to laser engrave a code into an already tempered glass pane. In one or more examples, the tempering of the laser engraved glass pane is obtained by thermal tempering of the laser engraved glass pane.

The laser used for laser engraving the pane will need to possess a high intensity and will in order to introduce micro-cracks into the glass pane. For obtaining high enough intensity, a pulsed laser will normally be used. An example of such is a nanosecond laser. Picosecond or femtosecond laser may also be used.

In one or more examples, a pulsed Nd:YAG laser (neodymium-doped yttrium aluminum garnet laser) emitting light with a wavelength centred at 1064 nm is used for laser engraving the glass pane. Alternatively, a frequency doubled Nd:YAG laser emitting light with a wavelength centred at 532 nm may also be used. The important aspect is not the wavelength but the ability to focus the pulsed laser into a narrow spot. Focusing optics will therefore be used in order to obtain a focused laser beam. At the focal point where the laser is focussed, i.e. point along the laser beam where the beam has its most narrow beam diameter, the intensity of the laser beam is the highest. This allows the user to focus the laser into the glass pane at predetermined specific depths and only introduce micro-cracks, i.e. laser engrave a code into the glass pane, around the focal point of the laser beam. At other glass layer depths, the intensity of the laser beam will not be high enough to introduce micro-cracks. In this way a code may be laser engraved into the glass pane in a position below the surface of the glass pane, i.e. a position inside the glass pane.

Figure 4A:
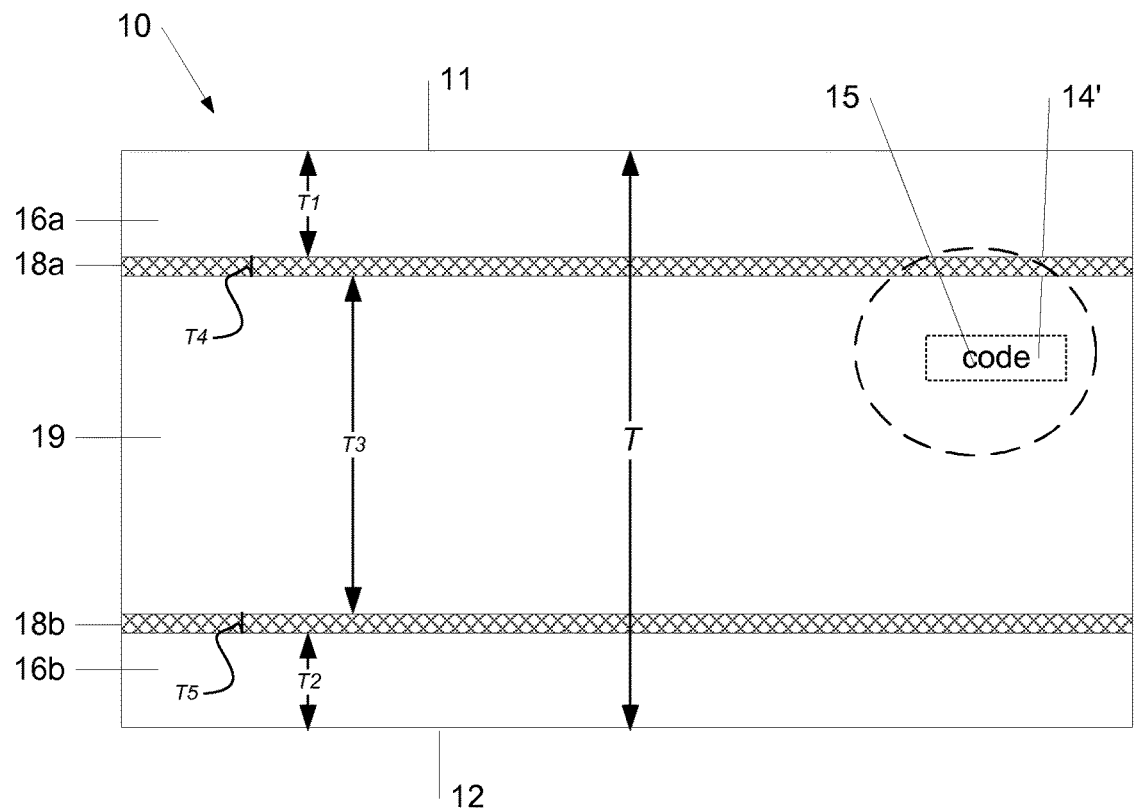
FIG. 4a shows part of a tempered glass pane in a side view and FIG. 4b shows a close up of the glass pane with a laser engraved code in a tensile stress region.
Figure 4B:
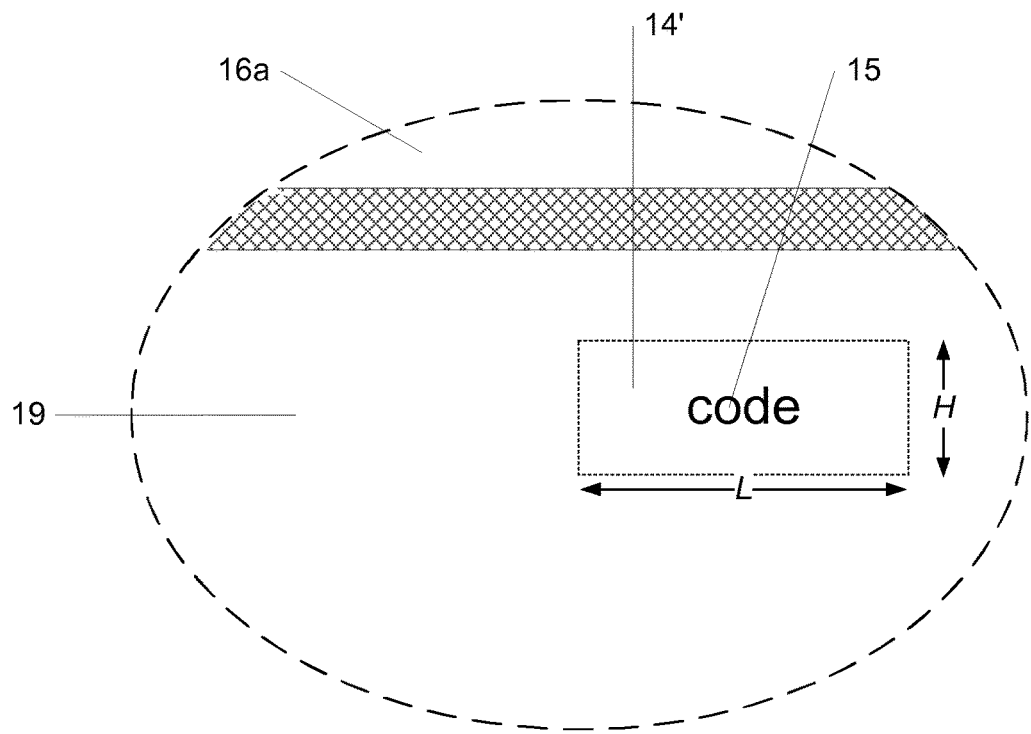

The tempered glass pane with the code 15 laser engraved into the laser engraved region 14 is shown in FIGS. 2*a-b* and 4*a-b* in a side view. As shown in FIG. 1*a*, the laser engraved region 14, 14' has a width W and a length L extending in parallel with/in the same plane as the inner surface 12. The width W and the length L are perpendicular to each other. In FIGS. 2*b* and 4*b*, the height H and length L are illustrated, where it can be seen that the length L is extending perpendicular to the height H.

Figure 5:
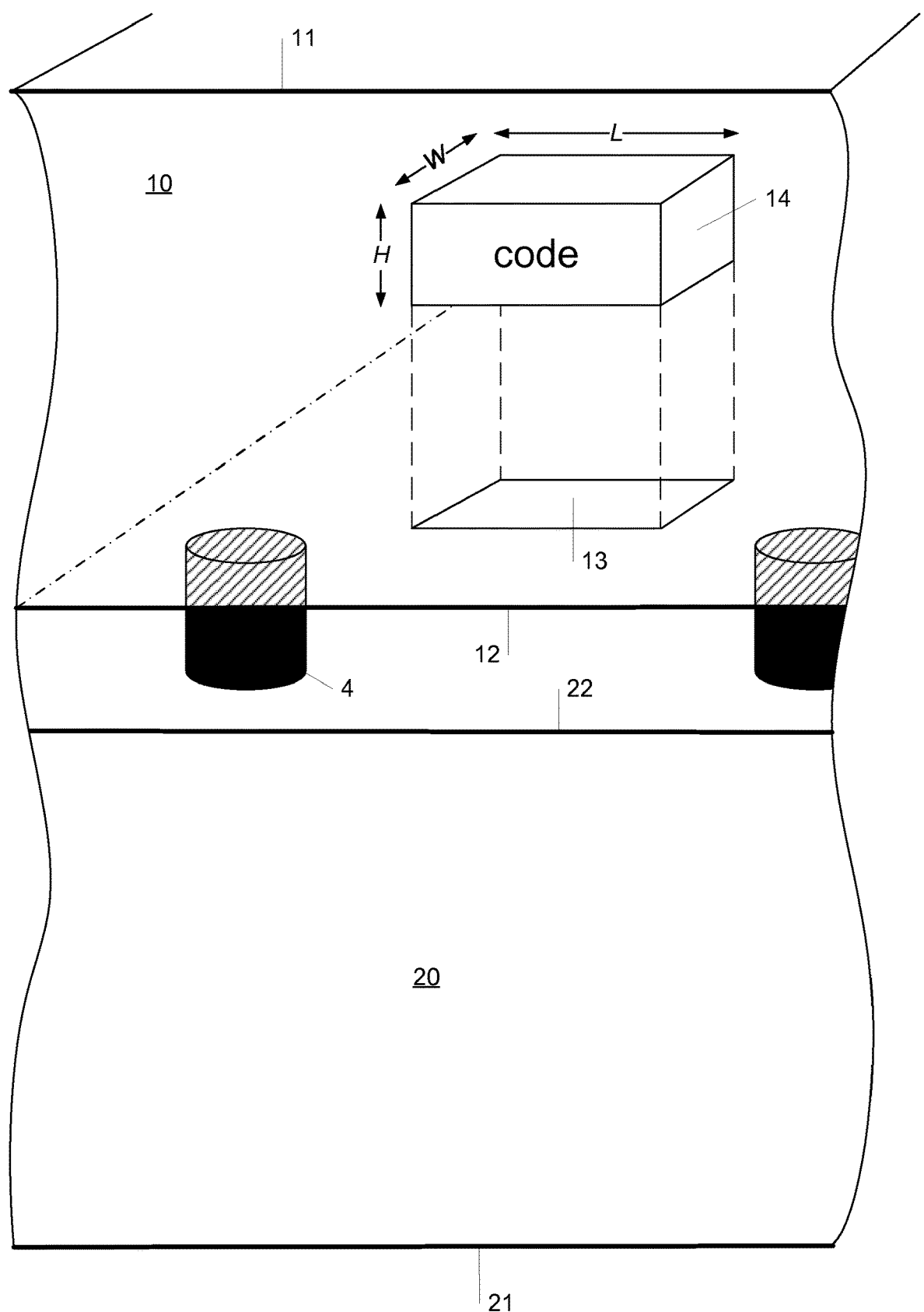
FIG. 5 shows a part of a tempered glass pane with a laser engraved code.

The laser engraved region 14, 14' may be positioned in part of the first glass pane, which is not in contact with the spacers 4. Thus, the inner surface of the first tempered glass pane 12 may have a first region 13 extending in parallel with the laser engraved region, wherein the first region 13 is having the same length and width as the laser engraved region 14. This is illustrated in FIG. 5 showing an illustration of a small part of a VIG unit seen in a semi perspective view.

The first region of the inner surface 13 of the first tempered glass pane 10 will normally not be in contact with the spacers 4. This protects the tempered glass in particular around the laser engraved region and minimizes the risk of cracks introduced by spacers adding additional stress to the laser engraved region in the tempered glass pane. The distance S between two consecutive spacers may thus be larger than the length L. In one or more examples, the distance S is at least 10% larger than the length L, such as at least 20% larger than the length L, such as at least 30% larger than the length L, such as at least 40% larger than the length L, such as at least 50% larger than the length L, such as at least 60% larger than the length L.

The spacers may be positioned approximately evenly around the laser engraved region 14, 14' and thereby the first region 13 in the first tempered glass pane 10. Thus, in one or more examples, the VIG unit comprises:

a first spacer is positioned on a first side of the first region with a first spacer-region distance to the first region, and a second spacer is positioned on an opposite side of the first region with a second spacer-region distance, wherein the first spacer-region distance and the second spacer-region distance differs by less than 50%, such as less than 40%, such as less than 30%, such as less than 20%, such as less than 10%, or such as less than 5%.

As shown in FIG. 1*a*, the laser engraved region 14 is often positioned close to the periphery of the glass pane. In one or more examples, the laser engraved region is at a position from the periphery of the first tempered glass pane of less than 30 cm, such as less than 25 cm, such as less than 20 cm, such as less than 15 cm, such as less than 10 cm, such as less than 5 cm.

Figure 3:
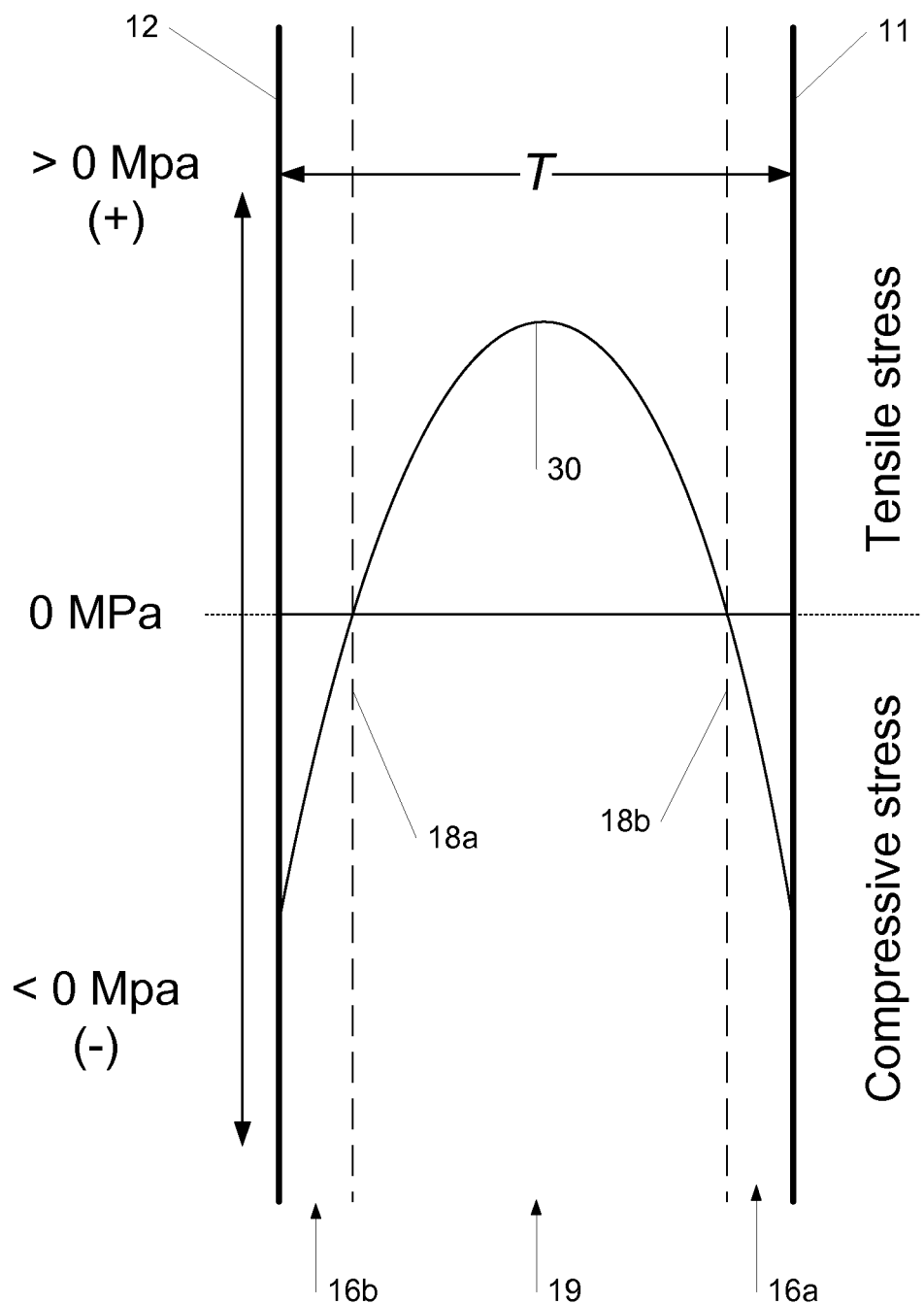
FIG. 3 show a tempered glass pane where a stress pattern distribution profile has been included.

Due to the tempering of the glass pane, the tempered glass pane 10 comprises a first compressive stress region 16*a* and a second compressive stress region 16*b* located adjacent to the surfaces 11, 12, respectively. Between the first compressive stress region 16*a* and the second compressive stress region 16*b* is an internal tensile stress region 19. The different stress regions are shown in FIG. 3.

The laser engraved region 14 may be positioned in the first compressive stress region 16*a* as shown in FIGS. 2*a* and 2*b* or alternatively in the second compressive stress region 16*b*. Yet alternatively, the laser engraved region 14' may be positioned in the internal tensile stress region 19 as shown in FIGS. 4*a* and 4*b*.

In one or more examples, two or more laser engraved regions are positioned in one or both of the first compressive stress region and the second compressive stress region of the first tempered glass pane. In one or more examples, two or more laser engraved regions are positioned in the internal tensile stress region of the first tempered glass pane. For the VIG unit shown in FIGS. 1*a* and 1*b*, a laser engraved region may be positioned in the first and/or second tempered glass pane in the first compressive stress region 16*a*, the second compressive stress region 16*b*, or the internal tensile stress region 19.

The compressive stress regions 16*a*, 16*b* has a thickness of T1 and T2, respectively for the first and the second compressive stress region 16*a*, 16*b*. The thickness of the tensile stress region 19 is similarly denoted T3. The thickness of the regions may vary depending on the tempering method applied. Normally, the tensile stress region will have the largest thickness, as the region where tensile stress is dominant over compressive stress in a larger area of tempered glass panes.

The distribution between the different regions will depend on the thickness of the glass pane T. The thickness of the two compressive regions T1, T2 as marked in FIGS. 2*a-b* need not be the same. In one or more examples, the thickness of the two compressive regions T1, T2 is between 0.6-1.0 mm, such as between 0.7-0.9 mm, or around 0.8 mm.

The tempered glass pane may further comprises a first transition region 18a bridging the internal tensile stress region 19 and the first compressive stress region 16a and a second transition region 18b bridging the internal tensile stress region 19 and the second compressive stress region 16b as shown in FIGS. 2a-b and 4a-b.

The thickness T4, T5 of the first and second transition regions 18a, 18b defines the distance between the tensile stress region 19 and the first and second compressive stress regions 16a, 16b, respectively. The thickness T4, T5 may be between 0.01-0.10 mm. Alternatively, the thickness T4, T5 of the first and second transition regions 18a, 18b may be insignificantly small, whereby the transition regions 18a, 18b marks the point where the tensile stress and the compressive stress are the same.

The stress pattern distribution of the tempered glass pane is illustrated in FIG. 3, where the stress pattern distribution profile 30 is marked in a tempered glass pane having two outer surfaces 11, 12 and a thickness T. The stress pattern distribution profile 30 illustrates that the stress is positive in the tensile stress region 19 and negative in the compressive stress regions 16a, 16b. The transition regions 18a, 18b are the regions where the stress is 0 MPa or very close thereto.

The laser engraved region 14, 14' shown in FIGS. 2a-b and 4a-b has a height H extending parallel with the direction defining the thickness T of the tempered glass pane and a length L extending longitudinally. The height H of the at least one laser engraved region may be between 0.05-0.4 mm, or between 0.1-0.3 mm, or between 0.15-0.25 mm. A small height H may prevent breakage of the tempered glass pane 10 when using it in the production of a VIG unit where the panes are subjected to high temperature/temperature differences and high pressures. Likewise, in the use of the VIG unit in a window, the lifetime of the window may be prolonged by having a thin laser engraved region with a small height H.

As shown in FIG. 2b, the laser engraved region 14 is positioned at a distance d1 from the surface 11 of the glass pane. As also shown in FIG. 2b, the laser engraved region 14 is positioned at a distance d2 from the tensile stress region 19 or the transition region 18a depending on the thickness of the latter.

In one or more examples, d1 is at least 0.1 mm. This creates an area in the glass pane, which distances the laser engraved region from the surface of the glass pane thereby making the glass pane more robust. In one or more examples, d1 is in range of 0.25 T-0.45 T, such as 0.25 T-0.40 T, or such as 0.30 T-0.35 T. This normally puts the laser engraved region 14' in the tensile stress region 19 as shown in FIGS. 4a and 4b.

In one or more examples where the laser engraved region 14 is in the first compressive stress region 16a, d2 is at least 0.1 mm. This creates an area in the glass pane, which distances the laser engraved region from the tensile stress region in the glass pane thereby making the glass pane more robust. In the tensile stress region, the stress has a higher value as shown in FIG. 3. If the code is laser engraved into this region, it may introduce too high tension in the glass pane such that the glass pane more easily break in a subsequent heating process when producing a VIG unit. Whether or not this happens depends on a number of things including the VIG unit production method and the pretreatment of the glass panes prior to pairing them for making the VIG unit.

The tempered glass panes may also include a low-emittance or low-emissivity (low-E) surface coating. In one or more examples, the inner surface of at least the first tempered glass pane further comprises a low-emittance coating. Alternatively, the inner surfaces of both glass panes comprise a low-emittance coating. Any suitable low-E coating may be used. For example, the inner surfaces of the first and second tempered glass panes can each have the same or different low-emittance coatings. Low-E coating may comprise several layers, including silver layer(s). Low-E coatings may include a layer of an infrared-reflecting film and one or more optional layers of a transparent dielectric film. The infrared-reflecting film, which may include a conductive metal such as silver, gold, or copper, reduces the transmission of heat through the coated pane. A dielectric film may be used to anti-reflect the infrared-reflecting film and to control other properties and characteristics of the coating, such as colour and durability. Commonly used dielectric materials include oxides of zinc, tin, indium, bismuth, and titanium, among others.

Example low-E coatings include one or two silver layers each sandwiched between two layers of a transparent dielectric film. Increasing the number of silver layers can increase the total infrared reflection, although additional silver layers can also reduce the visible transmission through the window and/or negatively impact the coating's colour or durability. In one or more examples, the low-E coating comprises multiple layers including a layer of $Si_3N_4$, The low-E coating in contact with the spacer can affect the way the spacer interfaces with the inner surface of the glass pane and reduce the risk of cracking in the glass.

In one or more examples, the low-E coating has a thickness of 1 to 500 nm, such as 10 to 400 nm, or such as 20 to 300 nm, or such as 50 to 250 nm.

Optical coatings may be applied using a suitable film-forming process such as physical or chemical vapour deposition or, for larger area glass panes, via lamination. During the lamination process, a thin film of the coating material is typically heated to a temperature effective to soften the coating material, which promotes a conformal mating of the coating material to a surface of a glass pane. Mobile polymer chains within the coating material develop bonds with the glass surfaces, which promote adhesion. Elevated temperatures also accelerate the diffusion of residual air and/or moisture from the glass-coating interface.

The tempered glass pane with a laser engraved coding, may be produced by a method comprising the steps of:
  providing a non-tempered glass pane having two opposite surfaces with a distance T between them defining the thickness of the glass pane,
  laser engraving a first code into a first laser engraving region using a pulsed laser focussed into the first laser engraving region, thereby obtaining a laser engraved glass pane, and
  tempering the laser engraved glass pane thereby obtaining a tempered glass pane with a laser engraved coding.

The tempered glass pane comprises:
  two compressive stress regions including a first and a second compressive stress region, where the two compressive stress regions each are adjacent to one of the opposing surfaces, and
  an internal tensile stress region positioned between the two compressive stress regions.

In one or more examples, the first laser engraved region is engraved into the first compressive stress region.

Additional laser engravings may be performed in other locations of the areas forming the first and/or second compressive stress region prior to tempering the laser engraved glass pane.

In one or more examples, the first laser engraved region is engraved into the internal tensile stress region. Additional laser engravings may be performed in other locations of the areas forming the internal tensile stress region prior to tempering the laser engraved glass pane.

The code(s) will normally be laser engraved into the glass pane before tempering the glass panes. By tempering the glass pane after the code has been introduced into the glass pane, large cracks in the glass pane is avoided.

The laser engraved tempered glass panes as described above, may be used in a vacuum insulated glazing unit for a window.

A vacuum insulated glazing unit may be produced by a method comprising the step of providing a glass pane unit comprising:
- a first tempered glass pane and a second tempered glass pane arranged in parallel, the first tempered glass pane and the second tempered glass pane each having an inner surface and an outer surface, the inner surfaces opposing each other, wherein the first tempered glass pane comprises at least one laser engraved region with a code engraved into the glass pane by means of laser engraving;
- spacers arranged between the opposed inner surfaces, and
- a side seal material peripherally arranged between the first tempered glass pane and the second tempered glass pane creating a sealed cavity between the glass panes.

The method further comprises the steps of:
- placing the glass pane unit in a furnace;
- heating the glass pane unit by at least the furnace to a temperature (Th);
- lowering the temperature to a curing temperature (Tcure), and
- reducing pressure in the internal cavity between the two tempered glass panes to a pressure of no higher than 0.001 mbar.

The temperature Th is in one or more examples between 380-460 degrees Celsius, such as between 400-440 degrees Celsius, or such as between 410-430 degrees Celsius.

The heat treatment temperature (Th) is in one or more examples maintained for at least 10 minutes, such as for at least 25 minutes, such as for at least 35 minutes.

The heat treatment temperature (Th) is in one or more examples maintained for a period of time between 3 and 60 minutes, such as between 25 and 50 minutes, such as between 35 and 45 minutes, such as between 10 and 30 minutes or such as between 10 and 20 minutes.

The curing temperature (Tcure) is in one or more examples between 275-380 degrees Celsius, such as between 290-360 degrees Celsius, or such as between 290-370 degrees Celsius, or such as between 300-360 degrees Celsius.

The pressure in the internal cavity between the two panes is in one or more examples reduced to a pressure of no higher than 0.0005 mbar or no higher than 0.0001 mbar.

The glass pane unit may in one or more examples of the method further comprises an evacuation opening positioned in the first tempered glass pane or the second tempered glass pane for evacuating the internal cavity, and a top frit material arranged around the evacuation opening. Reducing the pressure in the internal cavity between the two tempered glass panes may in these examples be obtained by evacuating the internal cavity through the evacuation opening. The method will further comprises the step of sealing the evacuation opening, so as to prevent gas from transferring between the internal cavity and the outside of the glass panes and thereby obtaining the vacuum insulated glazing unit.

The at least one laser engraved glass pane may be used in the production of a vacuum insulated glazing unit.

The at least one laser engraved glass pane may be used in a vacuum insulated glazing unit.

Articles may be prepared to include the vacuum insulated glass unit described herein. In one or more examples, a window includes the vacuum insulated glass unit. The window may further include a frame. The window may be used for residential or commercial purposes.

Also provided is use of the articles herein. For example, one or more examples provides use of the vacuum insulated glazing unit for a window. One or more example provides use of the glass pane and/or the tempered glass pane for a vacuum insulated glazing unit. One or more example provides use of the window for a fixed or ventilating window of a commercial building and/or residential building. One or more example provides use of the window for a roof window or a skylight window, for example a fixed or ventilating window for a roof or a skylight. One or more examples provides use of the window for a vertical window application, such as for use on the side of a commercial and/or residential building. The vacuum insulated glazing unit, glass pane, tempered glass pane, and window described herein can also be used for other applications that use a window or transparent screens, for example viewports, console screens, time pieces, vehicles, and others.

Disclosed herein is also a glad pane and the method for producing the glass pane as described in the following clouds:

1. A glass pane having a tempered surface, the glass pane having two opposite positioned surfaces with a distance T between them defining the thickness of the glass pane, the glass pane comprising:
   - two compressive stress regions including a first and a second compressive stress region, where the two compressive stress regions each are adjacent to one of the opposing surfaces, and
   - an internal tensile stress region positioned between the compressive stress regions, wherein the glass pane further comprises at least one laser engraved region with a code engraved into the glass pane by means of laser engraving,
   wherein the at least one laser engraved region has a height H extending parallel with the direction defining the thickness T of the pane, and
   wherein the at least one laser engraved region is positioned in one of the compressive stress regions.

2. A glass pane according to cloud 1, further comprising two transition regions, each of which is bridging the internal tensile stress region and a compressive stress region.

3. The glass pane according to any preceding cloud, wherein the glass pane has a thickness of between 1-6 mm, or between 2-5 mm, or between 2.5-4.5 mm.

4. The glass pane according to any preceding cloud, wherein the height H of the at least one laser engraved region is between 0.05-0.4 mm, or between 0.1-0.3 mm, or between 0.15-0.25 mm.

5. The glass pane according to any preceding cloud, wherein the at least one laser engraved region is positioned at a distance d1 of at least 0.1 mm from the surface of the glass pane.

6. The glass pane according to any preceding cloud, wherein the at least one laser engraved region is positioned at a distance d2 of at least 0.1 mm from the tensile stress region of the glass pane.

7. The glass pane according to any preceding cloud, wherein the thickness of the transition regions defining the distance between the tensile stress region and the compressive stress regions is between 0.01-0.10 mm.

8. The glass pane according to any preceding cloud, wherein the thickness of the transition regions defining the distance between the tensile stress region and the compressive stress regions is insignificantly small, whereby the transition region marks the point where the tensile stress and the compressive stress are the same.

9. The glass pane according to any preceding cloud, wherein the glass pane has been tempered by thermal tempering, chemical tempering, plasma tempering, or a combination comprising at least one of the foregoing.

10. The glass pane according cloud 9, wherein the glass pane has been tempered by thermal tempering.

11. The glass pane according to any preceding cloud, wherein the code has been laser engraved into the glass pane before tempering the glass pane.

12. The glass pane according to any preceding cloud, wherein at least one of the surfaces of the glass pane further comprises a low-emittance coating.

13. Method for producing a tempered glass pane with a laser engraved coding, the method comprising the steps of:
    providing a non-tempered glass pane having two opposite surfaces with a distance T between them defining the thickness of the glass pane,
    laser engraving a first code into a first laser engraving region using a pulsed laser focussed into the first laser engraving region, thereby obtaining a laser engraved glass pane, and
    tempering the laser engraved glass pane thereby obtaining a tempered glass pane with a laser engraved coding,
    wherein the tempered glass pane comprises:
        two compressive stress regions including a first and a second compressive stress region, where the two compressive stress regions each are adjacent to one of the opposing surfaces, and
        an internal tensile stress region positioned between the two compressive stress regions, and
    wherein the first laser engraved region is engraved into the first compressive stress region.

14. Method according to cloud 13 further comprising the step of laser engraving one or more additional codes into the first mentioned and/or one or more additional laser engraving regions in the first and/or second compressive stress region prior to tempering the laser engraved glass pane.

15. Method according to any of the clouds 13-14, wherein the pulsed laser is a nanosecond laser.

16. Method according to any of the clouds 13-15, wherein the pulsed laser is a Nd:YAG laser emitting light with a wavelength centred at 1064 nm.

17. Method according to any of the clouds 13-16, wherein the pulsed laser is a frequency doubled Nd:YAG laser emitting light with a wavelength centred at 532 nm.

18. Method according to any of the clouds 13-17, wherein the tempering of the laser engraved glass pane is obtained by thermal tempering of the laser engraved glass pane.

19. Use of at least one laser engraved glass pane according to any of the clouds 1-12 in the production of a vacuum insulated glazing unit.

20. Use of at least one laser engraved glass pane according to any of the clouds 1-12 in a vacuum insulated glazing unit.

REFERENCES 1 vacuum insulated glazing unit (VIG)
2 evacuation opening
4 spacers
6 side seal material
8 gap forming a void
10 first tempered glass pane
11 outer surface of the first tempered glass pane
12 inner surface of the first tempered glass pane
13 first region of the inner surface of the first glass pane
14 laser engraved code region in the first pane
14' laser engraved code region in the first pane
15 code in the first pane
16a first compressive stress region of the first pane
16b second compressive stress region of the first pane
18a first transition region of the first pane
18b second transition region of the first pane
19 tensile stress region of the first pane
20 second tempered glass pane
21 outer surface of the second tempered glass pane
22 inner surface of the second tempered glass pane
24 laser engraved code region in the first pane
25 code in the second pane
26a first compressive stress region of the second pane
26b second compressive stress region of the second pane
28a first transition region of the second pane
28b second transition region of the second pane
29 tensile region of the second pane
30 stress pattern distribution profile
S distance between two spacers
T, T' thickness of the tempered glass panes/distance from the inner surface to the outer surface
T1 thickness of the first compressive stress region
T2 thickness of the second compressive stress region
T3 thickness of the tensile stress region
T4 thickness of the first transition region
T5 thickness of the second transition region
L length of the laser engraved code
H height/thickness of the laser engraved code
W width of the laser engraved code
d1 distance from the outer surface to the to the middle of the laser engraved code region
d2 distance from the middle of the laser engraved code region to the first transition region

The invention claimed is:

1. A vacuum insulated glazing unit comprising:
    a first tempered glass pane and a second tempered glass pane arranged in parallel, the first tempered glass pane and the second tempered glass pane each having an inner surface and an outer surface, where the inner surfaces of the first tempered glass pane and the second tempered glass pane oppose each other;
    spacers arranged between the opposed inner surfaces;
    a side seal material peripherally arranged between the first tempered glass pane and the second tempered glass pane creating an internal void between the glass panes,
    wherein the first tempered glass pane has a thickness T defined by a distance between the inner surface and the outer surface of the first tempered glass pane, and the second tempered glass pane has a thickness T' defined by a distance between the inner surface and the outer surface of the second tempered glass pane,
    wherein the first tempered glass pane and the second tempered glass pane each comprises:
    a first compressive stress region located adjacent to the outer surface;
    a second compressive stress region located adjacent to the inner surface; and
    an internal tensile stress region located between the first and the second compressive stress regions;

wherein the first tempered glass pane comprises at least one laser engraved region with a code engraved into the first tempered glass pane by means of laser engraving, where the at least one laser engraved region has a height H extending parallel with a direction defining the thickness T of the first tempered glass pane;

wherein the at least one laser engraved region is positioned in the first compressive stress region or the second compressive stress region of the first tempered glass pane; and wherein the inner surface of the first tempered glass pane and/or the second tempered glass pane further comprises a low-emittance coating.

2. The vacuum insulated glazing unit according to claim 1, wherein the at least one laser engraved region has a length L extending perpendicular to the height H, and wherein two consecutive spacers are separated by a distance S being larger than the length L.

3. The vacuum insulated glazing unit according to claim 2, wherein the distance S is at least 10% larger than the length L, and/or wherein S is in the range of 20-120 mm.

4. The vacuum insulated glazing unit according to claim 1, wherein the at least one laser engraved region has a width W extending in parallel with the inner surface, wherein the inner surface of the first tempered glass pane has a first region extending in parallel with the laser engraved region, the first region having the same length and width as the laser engraved region, and wherein the first region of the inner surface of the first tempered glass pane is not in contact with the spacers.

5. The vacuum insulated glazing unit according to claim 1, comprising two or more laser engraved regions positioned in
one or both of the first compressive stress region and the second compressive stress region of the first tempered glass pane, or
the internal tensile stress region of the first tempered glass pane.

6. The vacuum insulated glazing unit according to claim 1, wherein the second tempered glass pane comprises at least one laser engraved region with a code engraved into the second tempered glass pane by means of laser engraving, where the at least one laser engraved region has a height H extending parallel with the direction defining the thickness T of the second tempered glass pane.

7. The vacuum insulated glazing unit according to claim 6, wherein the at least one laser engraved region in the second tempered glass pane has
a length L extending perpendicular to the height H,
a width W extending in parallel with the inner surface of the second tempered glass pane,
wherein the inner surface of the second tempered glass pane has a first region extending in parallel with the laser engraved region in the second tempered glass pane, the first region having the same length and width as the laser engraved region, and wherein the first region of the inner surface of the first second tempered glass pane is not in contact with the spacers.

8. The vacuum insulated glazing unit according to claim 6, wherein the at least one laser engraved region in the second tempered glass pane is positioned in:
the first compressive stress region or the second compressive stress region of the second tempered glass pane, or
the internal tensile stress region of the second tempered glass pane.

9. The vacuum insulated glazing unit according to claim 1, wherein:
the first tempered glass pane has a thickness of between 1-6 mm, and/or
the second tempered glass pane has a thickness of between 1-6 mm.

10. The vacuum insulated glazing unit according to claim 1, wherein the height H of the laser engraved region in the first and/or second tempered glass pane is/are between 0.05-0.4 mm.

11. The vacuum insulated glazing unit according to claim 6, wherein the laser engraved region is positioned at a distance d1 of at least 0.1 mm from
the outer surface of the first and/or the second tempered glass pane, or
the internal tensile stress region of the first and/or second tempered glass pane.

12. The vacuum insulated glazing unit according to claim 11, wherein d1 is in the range of 0.25 T-0.45 T.

13. The vacuum insulated glazing unit according to claim 2, wherein each of the first tempered glass pane and the second tempered glass pane further comprising a first transition region bridging the internal tensile stress region and the first compressive stress region and a second transition region bridging the internal tensile stress region and the second compressive stress region.

14. The vacuum insulated glazing unit according to claim 6, wherein the code has been laser engraved into the first tempered glass pane and/or the second tempered glass pane before tempering the glass pane(s).

15. The vacuum insulated glazing unit according to claim 1, wherein the side seal material comprises a glass solder frit material.

* * * * *